United States Patent [19]

Burris

[11] Patent Number: 4,555,335
[45] Date of Patent: Nov. 26, 1985

[54] OZONATOR FEED SYSTEM

[76] Inventor: W. Alan Burris, 7 E. Jefferson Cir., Pittsford, N.Y. 14534

[21] Appl. No.: 361,476

[22] Filed: Mar. 23, 1982

Related U.S. Application Data

[63] Continuation of Ser. No. 912,870, Jun. 5, 1978, abandoned, which is a continuation of Ser. No. 569,765, Apr. 21, 1975, abandoned, which is a continuation-in-part of Ser. No. 403,792, Oct. 5, 1973, abandoned.

[51] Int. Cl.⁴ ............................................... C02F 1/78
[52] U.S. Cl. .................................... 210/192; 210/205; 210/220; 261/36 R; 261/DIG. 42
[58] Field of Search ............ 210/760, 765, 192, 198.1, 210/205, 220; 261/36 R, DIG. 42, DIG. 75

[56] References Cited

U.S. PATENT DOCUMENTS

| | | | |
|---|---|---|---|
| 721,036 | 2/1903 | Gwynne et al. | 261/36 R |
| 1,613,998 | 1/1927 | Hartman | 210/192 |
| 1,808,956 | 6/1931 | Ketterer | 261/DIG. 75 |
| 2,606,150 | 8/1952 | Thorp | 210/760 |
| 2,778,499 | 1/1957 | Chamberlain et al. | 210/765 X |
| 2,970,821 | 2/1961 | Axt | 210/760 X |
| 3,326,747 | 6/1967 | Ryan et al. | 210/760 X |
| 3,445,001 | 5/1969 | La Raus | 210/192 X |
| 3,699,776 | 10/1972 | La Raus | 210/192 X |
| 3,775,314 | 11/1973 | Beitzel et al. | 261/DIG. 42 |

FOREIGN PATENT DOCUMENTS 417507 11/1923 Fed. Rep. of Germany ... 261/121 R

Primary Examiner—Robert Spitzer
Attorney, Agent, or Firm—Hoffman Stone

[57] ABSTRACT

A system for injecting air mixed with ozone into a water tank at normal line pressure of about 20 to 60 psi. Water from the outlet of the tank at, or near, the bottom of the tank is pumped through a by-pass circuit back into the tank near the bottom, and the output of an ozone generator is entrained with the water in the by-pass circuit. In the preferred form, the pump is of the kind capable of developing a suction at its inlet, the water is fed to it through a restrictor so that at the inlet the pressure is lower than the pressure in the ozone generator, and the gas is fed at the inlet of the pump.

3 Claims, 1 Drawing Figure

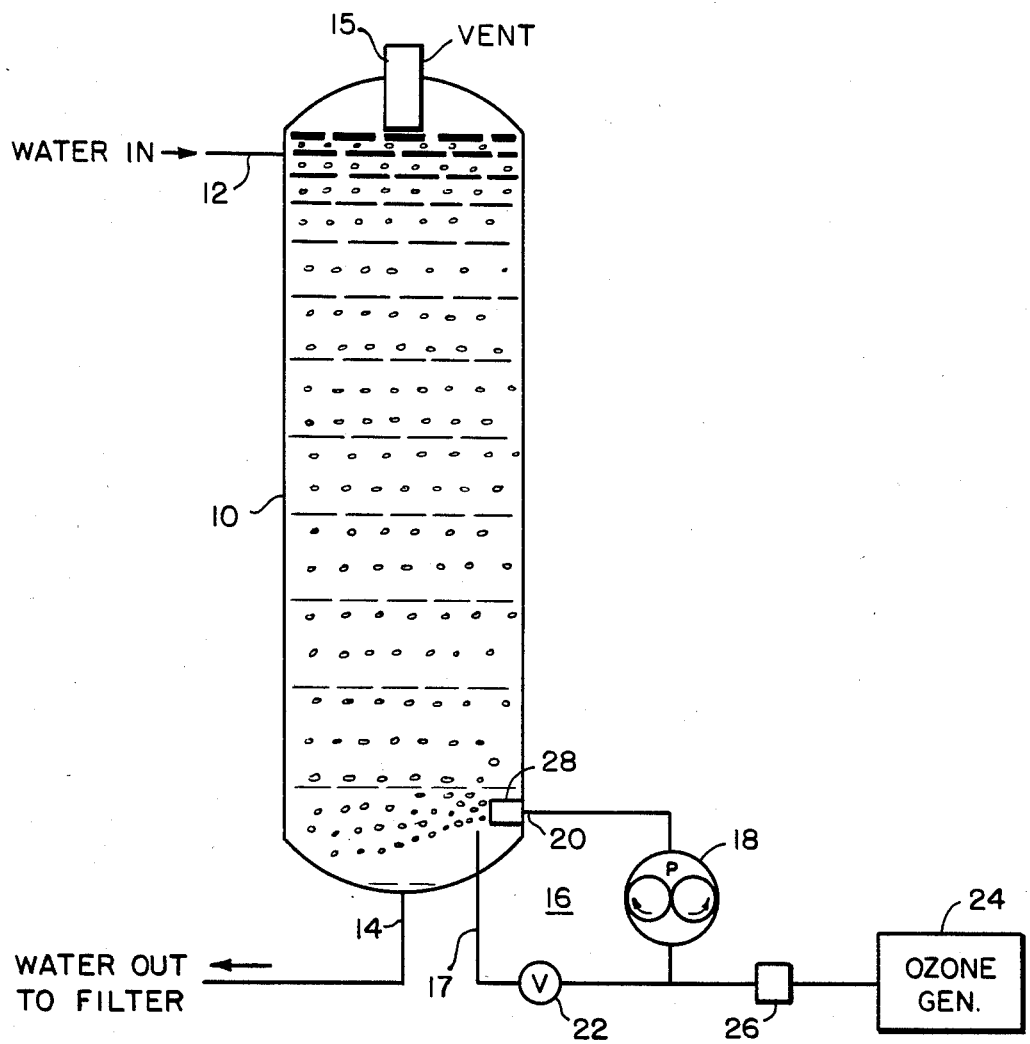

OZONATOR FEED SYSTEM

BRIEF DESCRIPTION

This application is a continuation of pending application Ser. No. 912,870, filed June 5, 1978, which in turn was a continuation of application Ser. No. 569,765, filed Apr. 21, 1975, bearing the same title as this application and now abandoned, which application was in turn a continuation-in-part of application Ser. No. 403,792, filed Oct. 5, 1973, and now also abandoned.

This invention relates to a novel method of and apparatus for purifying water by treating it with ozone, and, more particularly, to a novel system of injecting a mixture of air and ozone into a tank for treating water therein at normal household line pressure.

Ozonation has long been recognized as an effective treatment for purifying water, and its use appears to be increasing rapidly. The present invention is primarily concerned with relatively small ozonators of the kind suitable for treating water in a single family residence, which should be capable of operating for long periods without appreciable servicing.

In ozonators of this kind, a storage tank is usually provided for holding the water while it is treated, and, for maximum effectiveness of treatment, the tank should be at full line pressure. The mixture of air and ozone is typically fed into the tank at the bottom through a diffuser so that it passes up through the water in the form of minute bubbles. The diffuser sometimes becomes clogged with finely particulate matter precipitated out of the water by the treatment, and must then be cleaned or replaced. When the raw water includes certain types of contaminants, clogging of the diffuser becomes a sserious problem.

Ozonation of water, especially in small, domestic units, is usually carried out at relatively low pressures, either normal atmospheric or up to about 15 psi, gauge, because higher pressures reduce the efficiency and effectiveness of the ozone generator. When it was attempted to operate the ozone generator at atmospheric pressure, and to compress its output to introduce it into water at full line pressure, an undesirably large part of the ozone was lost by decomposition due to the heat of compression. It is highly desirable to treat the water at high pressure because the ozone dissolves more readily at high than at low pressures, and the treatment is more effective.

It appears also that in water ozone may act as a catalyst for the remaining oxygen in the gas mixture in attacking oxydizable matter in the water, and this effect is much greater at line pressure than at lower pressures, probably, it is thought, because of the increase in solubility of the gases at the higher pressure. The problem, therefore, is to generate the ozone at low pressure, then to introduce it into the water at high pressure without unduly heating it.

This is acccomplished according to the present invention by means of a suction arrangement in a by-pass circuit connected to the water storage tank. The output of the ozone generator is drawn into the water by suction, and then compressed after it is in the water. The water absorbs the heat of compression thereby preventing a significant rise in temperature and minimizing loss of ozone by thermal decomposition.

Water from the pump may be released inside the tank through a relatively coarse diffuser if desired, further to reduce the size of the undissolved bubbles. If a diffuser is used clogging presents little or no problem because the diffuser is coarse, and the pump develops enough pressure to force any accumulated solids out of it by action of the water.

DETAILED DESCRIPTION

A representative embodiment of the invention will now be described in detail in connection with the accompanying drawing, wherein the single FIGURE is a schematic diagram of an ozonator according to the presently preferred form of the invention.

As shown, an ozonator according to the preferred embodiment of the invention includes a pressure tank 10. which may be of any desired size, typically about twenty to forty gallons capacity, having an inlet 12 at its top, and an outlet 14 at the bottom. An air vent 15 is provided at the top of the tank for the escape of the treating gas. A short by-pass circuit 16 including a pump 18 is connected between an auxiliary outlet 15 and an auxiliary inlet 20 at one side of the tank near its bottom, Alternatively, the inlet of the pump 18 may be connected to the main outlet 14 of the tank as through a tee connection. Preferably, however, the arrangement is as shown with the auxiliary outlet 15 opening into the tank 10 at a level moderately above the bottom of the tank to avoid drawing sediment into the pump 18.

Ozonation of water frequently produces fairly large quantities of precipitated solids, which are conventionally removed by a filter (not shown). In the practice of the invention it is preferred than the solids be excluded so far as practicable from the pump, thereby avoiding the abrasive effect of the solids and extending the working life of the pump. This may be done either as shown by the auxiliary outlet 15, or, again alternatively, the inlet of the pump may be connected to the outlet of the filter. The choice in this regard will depend on the size of the installation as well as on the amount of precipitate encountered.

A restrictor device such as the valve 22 indicated schematically is connected between the auxiliary outlet 15 and the inlet of the pump 18. In practice, the restrictor device may be the pipe itself, its diameter being selected in view of the capacity of the pump to limit the flow of water to the pump enough so that the pump develops a suction at its inlet.

The pump may be of any desired kind capable of handling relatively large proportions of gas mixed with liquid without becoming airbound., and capable of producing a suction at its inlet, i.e., a pressure below atmospheric pressure, or at least below the pressure at which the ozone generator is operated. A gear pump has been found to give good results, but other types are available.

The pump 18 serves not only to compress the air-ozone mixture and injet it into the tank, but also to reduce the gas to fine bubbles in the water by reason of the turbulence within the pump and the chopping action of the pumping elements, thereby to maximize solution of the gas into the water. In this respect it does what the previously used finely porous diffusers did.

In some cases, especially large installations, it may be desired to operate the ozone generator at positive pressure of up to about 15 psi, gauge, and in those cases the pump 19 need not be capable of producing a positive suction below atmosspheric. In the small household unit, however, where cost is a major consideration, it is presently preferred to let the pump 18 do the whole job, drawing air through the generator by suction as well as mixing the gas into the water and injecting the water-air-ozone mixture into the tank. As pointed out in U.S. Pat. No. 3,455,803 issued July 15, 1969 to F. A. Miller this arrangement has the added advantage of preventing leakage of ozone into the atmosphere because a leak in the connection between the ozone generator and the pump will result only in leakage of outside air into the system instead of escape of the ozone enriched product.

It has also been found that a positive displacement pump such as, for example, a gear pump is capable of developing sufficient suction at its inlet to induce relatively large quantities of gas along with the water, much more gas in proportion to the pumping energy required than is possible with conventional venturi type devices. The intake of gas may easily equal the intake of water by volume thereby enabling the injection of adequate quantities of ozone without the need to pump a large quantity of water. This is so even when the ozone generator is operated under suction at its outlet with its inlet at approximately ambient atmospheric pressure.

The output of the ozone generator 24 is fed through a check valve 26 to the inlet of the pump 18, and is drawn, in the embodiment shown, from the generator 24 into the pump by the suction developed by the pump. The water from the pump is directed laterally into the tank 10, thereby assuring thorough distribution of the treating gas throughout the entire horizontal section of the tank.

In operation, the ozonator is typically run only during times when water is drawn from the tank 10 for use. At these times the ozone generator 24, which may be fed ordinary air at normal atmospheric pressure, or oxygen, produces ozone enriched air or oxygen, the pump operates, and the vent 15 is enabled. The output of the ozone generator 24 is drawn into the pump 18 by suction, mixed into the water in the pump, and then delivered to the tank 10, either directly, or, if desired, through a diffuser 28, which may be relatively coarse such as wire mesh, and which operates to reduce the size of the bubbles in the water entering the tank. Problems having to do with clogging of the previously used, finely porous diffusers are avoided; the ozone generator may be run at low pressure; the water is treated at full line pressure; and thermally induced decomposition of the ozone is avoided. In the present system, the gas is compressed only after it is introduced into the water, and heating is avoided because the heat of compression is absorbed by the water without a significant increase in temperature, and consequently with minimum decomposition of the ozone.

It has heretofore been customary when ozonating water to inject ozone in quantities equal to or greater than called for by the stoichiometrically calculated quantities needed to oxidize the particular impurities present. For example, for water with 20 parts per million (ppm) of iron, atomic basis, approximately 8.7 ppm of ozone constitute the stoichiometric equivalent. In an actual embodiment of the invention it has been found that only 1.5 ppm of ozone are required for the substantially complete treatment of 20 ppm of iron. Similarly, 1.5 ppm of ozone in the system of the invention has been found adequate to deal with more than 15 ppm of $H_2S$, in contrast to the stoichiometrically calculated requirement of 21 ppm.

This reduction in the amount of ozone required for effective purification is unexpected and surprising, and the reasons for it are not understood. It is thought, however, that the oxygen injected along with the ozone contributes importantly to the effect, that the ozone may act as a catalyst between the oxygen and the impurities, and that the increased solubility of both ozone and oxygen at pressures substantially above atmospheric is also important, perhaps increasing the catalytic effect as well as merely the quantities of dissolved gas.

What is claimed is:

1. Apparatus for treating water with ozone comprising:
  a. a tank for storing water at normal line pressure, said tank having an inlet near its top, an outlet near its bottom, and an auxiliary inlet near its bottom,
  b. a by-pass circuit connected between the outlet of said tank and the auxiliary inlet,
  c. a pump connected in said by-pass circuit for pumping water from the outlet of said tank back into said tank through said auxiliary inlet, said pump being of the positive displacement type and capable of pumping large quantities of gas entrained in the water without becoming airbound,
  d. means for restricting the flow of water from said tank to said pump enough so that in operation the pump develops a suction at its inlet;
  e. an ozone generator, and
  f. means connecting the outlet of said ozone generator to the inlet of said pump so that in operation suction developed by the pump at its inlet draws gas from said generator into siad pump, said pump being the sole source of suction in the apparatus and providing substantially the only impetus drawing gas from the generator.

2. Apparatus according to claim 1 wherein said pump is a gear pump.

3. Apparatus according to claim 1 including also a diffuser adjacent to said auxiliary inlet for reducing the size of gas bubbles in the water entering the tank through said auxiliary inlet.

* * * * *